(12) United States Patent
Suryono et al.

(10) Patent No.: US 7,417,929 B2
(45) Date of Patent: Aug. 26, 2008

(54) OPTICAL DISK DATA PROCESSING DEVICE AND DATA RECORDING/REPRODUCTION DEVICE HAVING INTERRUPTION AND RESTART OF WRITE PROCESSING ON THE RECORDING MEDIUM

(75) Inventors: Yanto Suryono, Tokyo (JP); Shigeru Okita, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 538 days.

(21) Appl. No.: 10/937,515

(22) Filed: Sep. 8, 2004

(65) Prior Publication Data

US 2005/0078583 A1    Apr. 14, 2005

(30) Foreign Application Priority Data

Sep. 8, 2003    (JP)    ............................. 2003-315181

(51) Int. Cl.
*G11B 5/09*    (2006.01)
(52) U.S. Cl. ................ 369/53.31; 369/30.23; 369/59.12
(58) Field of Classification Search .............. 369/53.31, 369/53.18, 53.19, 30.23; *G11B 5/09*
See application file for complete search history.

(56) References Cited

U.S. PATENT DOCUMENTS 6,487,616 B1 * 11/2002 Hayashi ....................... 710/59
6,584,053 B1 * 6/2003 Tsukihashi ................ 369/53.34
6,992,957 B2 * 1/2006 Hayashi et al. ............ 369/47.3
7,145,856 B2 * 12/2006 Shimoi et al. ............. 369/53.36
7,242,651 B2 * 7/2007 Asano et al. .............. 369/47.28

FOREIGN PATENT DOCUMENTS

JP    2000-40302    *    1/2000

* cited by examiner

*Primary Examiner*—Aristotelis M Psitos
(74) *Attorney, Agent, or Firm*—William B. Kempler; W. James Brady, III; Frederick J. Telecky, Jr.

(57) ABSTRACT

The objective of this invention is to provide a type of data processing device and a type of data recording/reproduction device that can restart data write processing correctly from an interruption position after data write processing on a recording medium is interrupted. When write is interrupted, prescribed information that indicates the tail of the data written before said interruption is obtained from the written data. When write is restarted, first, data read processing is started. From the read data, the tail of the write data before said interruption is determined based on said obtained information. Then, data write processing is restarted and connected to said determined tail of the write data. In write clock signal generating part (45), write clock signal CK3 locked to the phase of read clock signal CK2 is generated. Consequently, it is possible to suppress discontinuity in the connection of write in company with switching from read processing to write processing.

14 Claims, 5 Drawing Sheets

OPTICAL DISK DATA PROCESSING DEVICE AND DATA RECORDING/REPRODUCTION DEVICE HAVING INTERRUPTION AND RESTART OF WRITE PROCESSING ON THE RECORDING MEDIUM

FIELD OF THE INVENTION

This invention pertains to a type of data processing device and a type of data recording/reproduction device that perform data recording/reproduction on an optical disk or other recording medium. Especially, this invention pertains to a type of data processing device and data recording/reproduction device that allow interruption and restart of write processing on the recording medium.

BACKGROUND OF THE INVENTION

Usually, when write is performed on an optical disk, it is necessary to perform the write operation while a preset speed is maintained. For this purpose, data transfer should be performed from a host device that supplies the write data (such as a personal computer, etc.) with the preset write speed maintained with respect to an optical disk device that performs the write processing.

On the other hand, in many cases, the host device also performs other tasks parallel to the processing of transfer of data to the optical disk device. Consequently, when the write speed is multiplied to a high level, it becomes difficult to maintain the required data transfer speed.

In a conventional optical disk, as shown in U.S. patent application Ser. No. 10/078,515 filed Sep. 8, 2004 device, the following method is adopted: the write data fed from the host device are temporarily stored in a buffer memory; then, the stored write data are sequentially read out to perform write processing. In this way, variation in the data transfer speed of the host device can be absorbed.

However, even when said buffer memory is set, if the supply of data from the buffer memory lags due to abnormality in the host device, etc., the stored data may be used up. This phenomenon is called "buffer under-run." For example, if such buffer under-run takes place midway during a write operation on a CD-R, DVD-R, etc., that allows only one-time write, the optical disk may be damaged.

As a method commonly adopted to avoid damage of an optical disk due to said buffer under-run, the write operation is paused. That is, the optical disk device monitors the data quantity stored in the buffer memory, and, when the data quantity falls below a prescribed level, the write operation is temporarily interrupted. Then, when the host device recovers to a normal state in which data can be transferred normally, write is restarted from the position of interruption.

Also, there are factors other than said buffer under-run, such as impact, vibration, shaking, etc. applied to the optical disk device from outside. These factors may cause out of lock for the servo system of the optical disk. In such case, too, it is necessary to perform temporary interruption and then restart of the write operation.

In this way, the optical disk device should have a configuration that can interrupt write when certain interruption factors occur, and then can restart the write operation from the interrupted position after the interruption factor is removed.

Japanese Kokai Patent Application No. 2002-230772 describes technology pertaining to a device that allows interruption and restart of a data recording operation for an optical disk. However, when data are read from an optical disk, usually, a clock signal that should be used in synchronizing the read processing is reproduced based on data written in the optical disk. That is, the clock signal for read is reproduced from data read from the optical disk itself, and data read processing is performed in synchronization with this clock signal for read.

Also, for a conventional optical disk for recording, the slot for guiding is formed in a spiral shape so that a laser beam in write can go along the recording track correctly. On the edge portion of the slot, a periodic wiggling known as wobble is formed. When the optical disk is rotated at a steady speed, write processing on the optical disk is performed in synchronization with a clock signal reproduced based on said wobble. On the other hand, when the optical disk is rotated at a steady linear velocity, write processing is performed in synchronization with a clock signal at a fixed frequency generated with an oscillator or the like.

In this way, usually, the phase is not synchronized between the clock signal for read used in reading data from the optical disk and the clock signal for write used in writing data on the optical disk.

On the other hand, in the device described in said Japanese Kokai Patent Application No. 2002-230772, data recording is performed on the optical disk in synchronization with counting of a counter, and, when the recording operation is interrupted, the value of said counter just before said interruption is stored. Then, a laser beam is irradiated from a position on the disk located by a prescribed data quantity in back of the data recorded just before said interruption, and, while the position on the optical disk is determined, recording is restarted based on said stored value of the counter.

During the trace period before restart of the recording operation, read processing is performed for prescribed information (Q-channel data, etc.) in the data written on the optical disk, and synchronization is performed between said read information and said prescribed information fed as the write data to the laser driving part.

Consequently, in the device described in Japanese Kokai Patent Application No. 2002-230772, when the mode shifts from the trace period to the recording operation, it is necessary to switch the system clock as the reference of timing for recording/reproduction processing from the clock signal for read to the clock signal for write.

For example, as shown in FIG. 9, when simple switching is performed from clock signal CLK_A without securing phase locking (FIG. 9(A)) to clock signal CLK_B (FIG. 9(B)), clock signal CLK_SEL obtained in the switching (FIG. 9(C)) may contain glitches as shown in the figure.

Also, the following scheme may be adopted: as shown in FIG. 10, when switching is performed from clock signal CLK_A without phase locking (FIG. 10(A)) to clock signal CLK_B (FIG. 10(B)), first of all, at fall edge T5 of clock signal CLK_A (FIG. 10(A)), the output of clock signal CLK_SEL (FIG. 10(C)) is fixed on the low level. Then, at the fall edge T6 of clock signal CLK_B, switching of the clock is performed.

n this scheme, however, although no glitch as shown in FIG. 9 occurs, the low-level period of the clock signal at the switching time becomes longer, and the phase becomes discontinuous.

Usually, by means of a PLL (phase-locked loop), a reference clock is multiplied to generate a clock signal for determining timing of recording/reproduction processing so that performance of recording/reproduction at plural different speeds is enabled. If the reference clock signal input to said PLL contains a phase discontinuous portion, such as those shown in FIGS. 9 and 10, PLL may be out of locking, and the clock signal becomes unstable.

As explained above, in the method in which when the recording operation is restarted, the system clock signal as a reference of the processing timing is switched from the clock signal for read to the clock signal for write without securing phase locking, phase discontinuity takes place in the system clock signal during switching, so that it becomes difficult to restart write correctly from a write interruption position. This is undesired.

Also, because the write timing is unstable due to a discontinuous variation in the clock signal, error in the recording data may take place easily near the write restart position. This is also undesired.

A general objective of this invention is to solve the aforementioned problems of conventional methods by providing a type of data processing device and a type of data recording/reproduction device that can restart write processing of data correctly from an interrupting position after data write processing on the recording medium is interrupted.

SUMMARY OF THE INVENTION

This and other objects and features are provided, in accordance with one aspect of the present invention by a data processing device that performs data read processing from a recording medium in synchronization with a read clock signal reproduced based on data written in the recording medium, and it performs data write processing in said recording medium in synchronization with a write clock signal.

Said data processing device has the following means: a control means that performs the following operation: when a write interruption instruction is input, said data write processing is interrupted, and prescribed information that indicates the tail of the data written before said interruption is fetched from the write data, and, when a write restart instruction is input, said data read processing is started, the tail of the data written before said interruption is determined from the read data based on said fetched information, and said data write processing is restarted after the tail of said determined write data; and a clock signal generating means that generates said write clock signal with phase synchronized with said read clock signal.

Said write clock signal generating means may contain a synchronizing means that synchronizes an input reference clock signal with said read clock signal, and, when said data write processing is restarted, holds the synchronization state before said restart.

Said write clock generating means may have the following means: a selecting means that selects and outputs said read clock signal when said write restart instruction is input, and selects and outputs said reference clock signal synchronized with said synchronizing means when said data write processing is restarted; and a second multiplicative means that multiplies the clock signal output from said selecting means by a prescribed multiplicative ratio and generates said write clock signal.

Also, said data processing device may have an interrupt instruction generating means that has a prescribed signal having an amplitude corresponding to the vibration state of the device as input, and generates said write interruption instruction when the amplitude of said input signal reaches a prescribed amplitude.

According to a second aspect of the present invention a data recording reproduction device performs data read processing from a recording medium in synchronization with a read clock signal reproduced based on data written in the recording medium, and it performs data write processing in said recording medium in synchronization with a write clock signal.

This data recording/reproduction device has the following means: a control means that performs the following operation: when a write interruption instruction is input, said data write processing is interrupted, and prescribed information that indicates the tail of the data written before said interruption is fetched from the write data, and, when a write restart instruction is input, said data read processing is started, the tail of the data written before said interruption is determined from the read data based on said fetched information, and said data write processing is restarted after the tail of said determined write data; and a clock signal generating means that generates said write clock signal with phase synchronized with said read clock signal.

Therefore, after data write processing on a recording medium is interrupted, it is possible to restart the data write operation correctly from the interrupting position.

REFERENCE NUMERALS AND SYMBOLS AS SHOWN IN THE DRAWINGS

In the figures, 1 represents an optical disk, 2 an optical pickup, 3 an analog front end part, 4 a digital front end part, 5 a host device, 40 a DSP, 41 a clock signal reproduction part, 42 a read data processing part, 43 a wobble detecting part, 44 a write clock signal generating part, 45 a write data processing part, 46 a buffer memory, 47 a write interruption control part, 48 a write pulse signal generating part, 49 an interrupt instruction generating part, 451, 455 a multiplicative part, 452 a frequency division part, 453 a synchronizing part. 454, 4532, 4537 a selecting part, 491 an analog/digital converting part, 492 a noise filter, 493 an offset detecting part, 494 an offset removing part, 495 an absolute value output part, 496 a binary forming part, 497 a pulse shaping part, 4531, 4534 a shift register, 4535 a flip-flop circuit, 4536 a selection control part, and AN_1~AN_N-1 an AND circuit.

DESCRIPTION OF THE EMBODIMENTS

Figure 1:
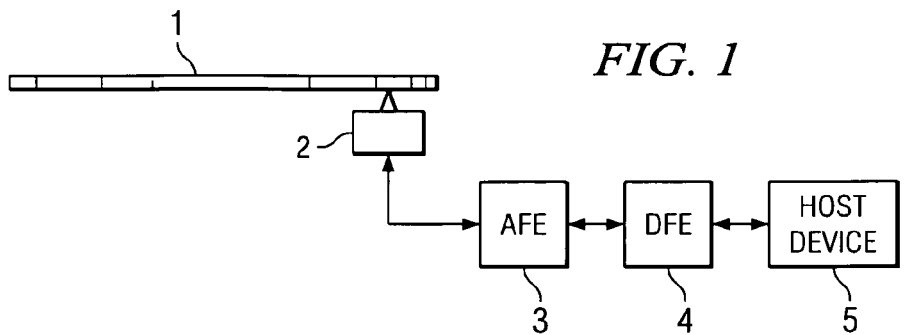
FIG. 1 is a block diagram illustrating an example of the constitution of a data recording/reproduction device in an embodiment of this invention.

FIG. 1 is a block diagram illustrating an example of a data recording/reproduction device in an embodiment of this invention.

The data recording/reproduction device shown in FIG. 1 has optical pickup 2, analog front end part 3 and digital front end part 4. Digital front end part 4 is an embodiment of the data processing device of this invention.

Optical Pickup 2

For optical pickup 2, when data written in optical disk 1 are read, a laser beam for data read and for generating a control signal is irradiated on the recording surface of optical disk 1, and light reflected from the recording surface is converted to an electric signal. Also, when data are written in optical disk 1, a laser beam for write on the recording surface of optical disk 1 is irradiated to write the data, and, at the same time, a laser beam for generating a control signal is irradiated, and its reflected light is converted to an electric signal.

Analog Front End Part 3

In analog front end part 3, the electric signal converted from the reflected light in optical pickup 2 is subjected to binary treatment and waveform shaping treatment, or another signal treatment to reproduce a pulse-shaped read signal corresponding to the recording data of optical disk 1, and, at the same time, to generate various control signals.

Examples of control signals generated with analog front end part 3 include a tracking error signal that shows the error of tracking when tracking treatment is performed for the data recording track on the optical disk, a focus error signal that shows the error in focal distance when treatment is performed with a constant focal distance between optical disk 1 and the lens of optical pickup 2, etc.

Also, corresponding to a write pulse signal input from digital front end part 4, analog front end part 3 generates a signal for driving the laser source of optical pickup 2, and a laser beam for data write is generated.

Digital Front End Part 4

Digital front end part 4 performs various processing pertaining to data write in optical disk 1, as well as data read from the optical disk. For example, when host device 5 instructs data write in optical disk 1, and the data to be written is supplied from said device, digital front end part 4 performs a prescribed encoding processing for the supplied data to generate a write pulse signal that is input to analog front end part 3. Also, a rotating mechanism (not shown in the figure) of optical disk 1 and a driving mechanism (not shown in the figure) of optical pickup 2 are under servo control based on the aforementioned tracking error signal, focus error signal, and other control signals, so that the laser beam for write is irradiated on the assigned write position of optical disk 1.

Also, when host device 5 instructs read of data from optical disk 1, digital front end part 4 performs servo control of said rotating mechanism and driving mechanism, and a laser beam for read is irradiated on the assigned read position of optical disk 1. Then, a prescribed decoding processing is performed on the read signal output from analog front end part 3 corresponding to the reflected light, and the data reproduced in said decoding processing is output to host device 5.

In addition, for digital front end as shown in U.S. patent application Ser. No. 10/937,515 filed Sep. 8, 2004 part 4, during data write in optical disk 1, if the supply of data from host device 5 lags and it appears that buffer under-run may occur, if the servo control is out of lock due to impact or the like, and if other prescribed interruption factors occur, prescribed information that indicates the tail of the write data is fetched from the write data, and the write processing is interrupted. Then, the fact of generation of the interruption of write is notified to host device 5.

Then, if there is an instruction of restart of write from host device 5, digital front end part 4 starts data read processing of optical disk 1, and from the read data, the tail of the write data before interruption is determined based on the aforementioned obtained information. Then, data write processing of optical disk 1 is restarted after the tail of said determined write data.

Also, as will be explained later, digital front end part 4 locks the phase between the read clock signal as the reference of timing in read processing and the write clock signal as the reference of timing in write processing. In this way, the data can be correctly written and annexed to the tail of the write data determined in the read processing.

In the following, the constitution of said digital front end part 4 will be explained with reference to FIG. 2.

Figure 2:
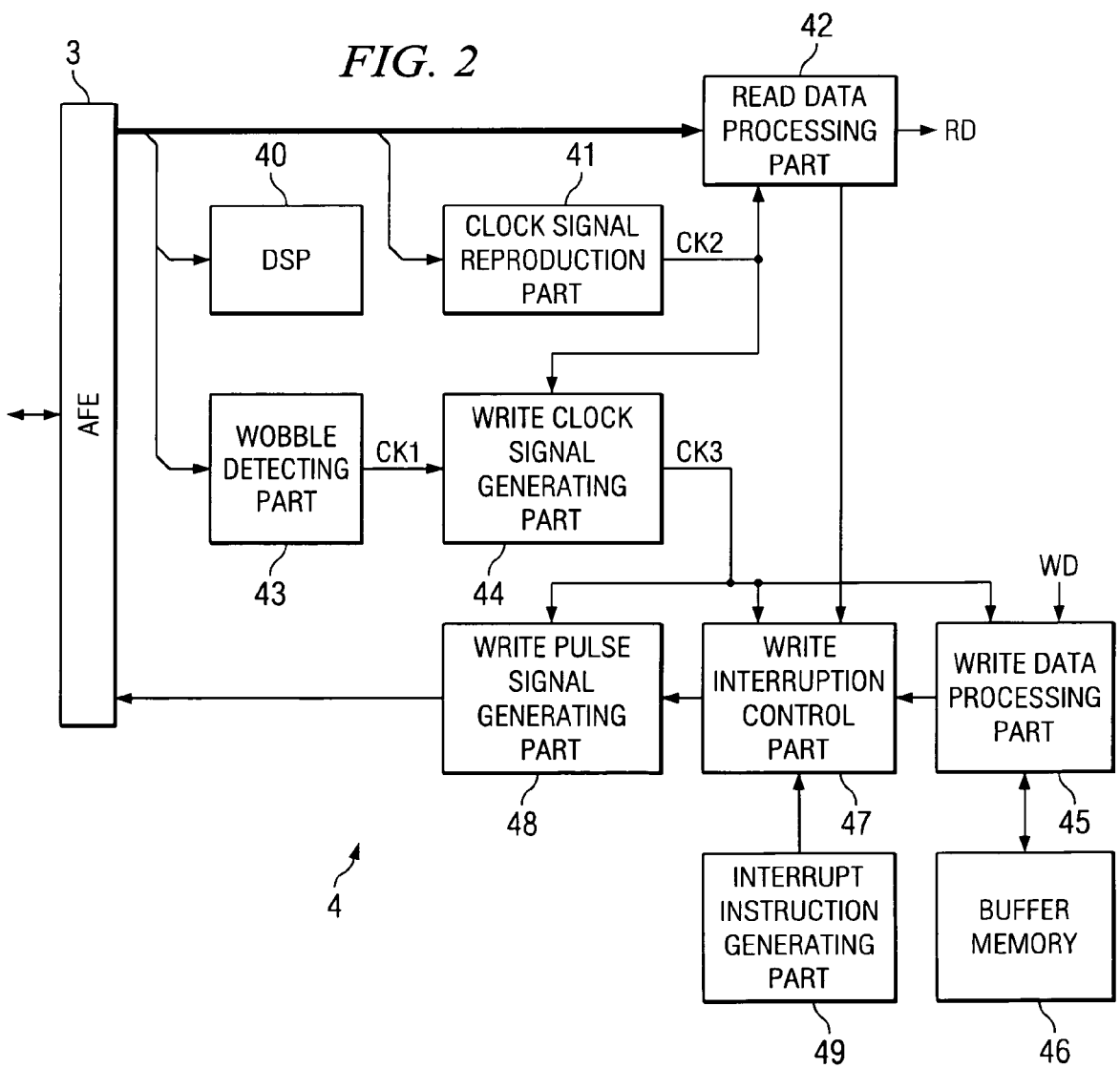
FIG. 2 is a block diagram illustrating an example of the constitution of the digital front end part in an embodiment of the data processing device of this invention.

FIG. 2 is a block diagram illustrating an example of the constitution of digital front end part 4 in an embodiment of the data processing device of this invention. In FIG. 2, analog front end part 3 is also shown.

Digital front end part 4 shown as an example in FIG. 2 has DSP 40, clock signal reproduction part 41, read data processing part 42, wobble detecting part 43, write clock signal generating part 44, write data processing part 45, buffer memory 46, write interruption control part 47, write pulse signal generating part 48, and interruption instruction generating part 49. Also, write clock signal generating part 44 is an embodiment of the write clock signal generating means of this invention. Write interruption control part 47 is an embodiment of the control means of this invention. Interruption instruction generating part 49 is an embodiment of the interruption instruction generating means of this invention.

DSP 40

Based on the tracking error signal, focus error signal, and other control signals output from analog front end part 3, DSP 40 controls the spindle motor that rotates optical disk 1, the thread motor that drives optical pickup 2 to move, and other driving mechanisms so that the laser beam of optical pickup 2 can be irradiated on a prescribed position of optical disk 1.

Clock Signal Reproduction Part 41

Based on a periodic signal component contained in the pulse-like read signal from optical disk 1 output from analog front end part 3, clock signal reproduction part 41 reproduces read clock signal CK2 as the reference of timing in read processing.

Read Data Processing Part 42

Synchronized with read clock signal CK2, read data processing part 42 performs a prescribed decoding processing for the read signal output from analog front end part 3, and reproduces read data RD.

Wobble Detecting Part 43

Based on a control component containing the wobble component output from analog front end part 3, wobble detecting part 43 reproduces wobble clock signal CK1 corresponding to the periodic wiggle shape of the wobble.

Write Clock Signal Generating Part 44

Write clock signal generating part 44 generates write clock signal CK3 locked in phase with read clock signal CK2. The detailed constitution of write clock signal generating part 44 will be explained later with reference to FIG. 3.

Write Data Processing Part 45

During data write processing, write data processing part 45 sequentially accommodates write data WD supplied from host device 5 in buffer memory 46, and, at the same time, it sequentially reads write data stored in buffer memory 46 and performs a prescribed encoding processing, and outputs a signal through write interruption control part 47 to write pulse signal generating part 48.

Write Interruption Control Part 47

When a write interruption instruction is generated in interruption instruction generating part 49, write interruption control part 47 interrupts the data write processing for optical disk 1. For example, when a write interruption instruction is received, the data before write output from write data processing part 45 are surveyed, and the appropriate interruption position where generation of the pulse signal in write pulse signal generating part 48 can be normally interrupted and write can be easily restarted is located. Then, at the interruption position, data transfer from write data processing part 45 to write pulse signal generating part 48 is stopped, so that irradiation of the laser beam from optical pickup 2 is stopped. Also, write interruption control part 47 obtains prescribed information that indicates the tail of the data written in optical disk 1 before interruption from the data output from write data processing part 45.

For example, in the data written in optical disk 1 that are divided into plural data segments according to a prescribed signal format, information indicating the tail of the write data is obtained based on information for identification of said data segments.

For example, for a signal written in a CD-R, a data segment of a frame is formed from a 588-bit bit row, and 98 said frames are collected to form a sector of the data segment. In 80 frames among the 98 frames that form a sector, in addition to the data of the write object, the position information of the sector on the recording track, etc. are also contained as information that can identify said sector from other sectors.

For optical disk 1 having said signal format, write interruption control part 47 obtains said position information of the sector where said write interruption position is present and information of the bit number from the head of the sector to the write interruption position as information indicating the tail of the write data.

Then, when a write restart instruction is input from host device 5, write interruption control part 47 provides instruction to each portion of digital front end part 4, and starts data read processing. Then, the tail of the write data before interruption is determined based on said obtained information from among the read data.

For example, in said case when information of the position of the sector where the write interruption position is present and information of the bit number from the head of the sector to the write interruption position are obtained, write interruption control part 47 first specifies the head of the sector from the read data based on the position information of the sector. Then, the bits of the read signal are counted from the determined head, and, by comparing this count value with said information of the bit number obtained as aforementioned, the tail of the write data before interruption is determined. In this way, if the tail of write data is specified, write interruption control part 47 gives an instruction to each part of digital front end part 4, and the data writing process resumes from the position which continues from the tail.

Write Pulse Signal Generating Part 48

For write pulse signal generating part 48, in the case of data write processing, the encoded write data output from data processing part 45 are input, and the input write data are processed corresponding to the type of disk as the object of write instructed with a control part not shown in the figure. In this way, an appropriate write pulse signal corresponding to the type of optical disk is generated, and it is output to analog front end part 6. Also, said write data processing part 45, write interruption control part 47, and write pulse generating part 48 execute the various processing operations at timing synchronized with write clock signal CK3.

Interruption Instruction Generating Part 49

In the case of data write processing, interruption instruction generating part 49 monitors the quantity of write data stored in buffer memory 46, and, if the data quantity falls below a prescribed level, a write interruption instruction is generated. Interruption instruction generating part 49 has a prescribed signal having an amplitude corresponding to the vibration state of the device input to it, and generates a write interruption instruction when the amplitude of the input signal reaches a prescribed amplitude.

For example, the amplitude of a tracking error signal output from analog front end part 3 or the amplitude of a detection signal of a vibration sensor not shown in the figure is surveyed, and, when the amplitude reaches a prescribed amplitude or when the state at the prescribed amplitude lasts for a prescribed period, a write interruption instruction is generated. Also, the detailed constitution of the portion that generates the write interruption instruction corresponding to the vibration of the device in said interruption instruction generating part 49 will be explained later with reference to FIG. 6.

In the following, the constitution of write clock signal generating part 44 will be explained with reference to FIG. 3.

Figure 3:
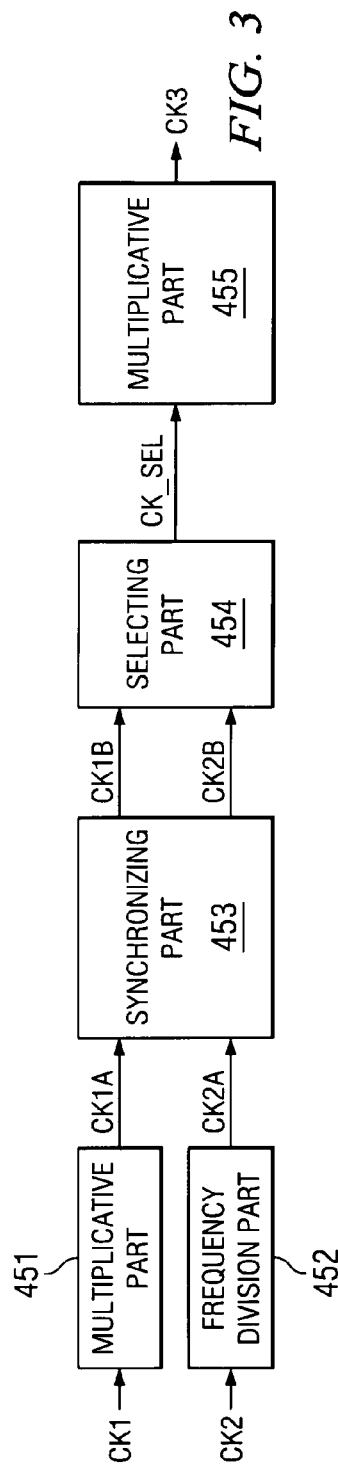
FIG. 3 is a block diagram illustrating an example of the constitution of the write clock signal generating part in the embodiment of this invention.

FIG. 3 is a block diagram illustrating an example of the constitution of write clock signal generating part 44 in the embodiment of this invention. Write clock signal generating part 44 shown as an example in FIG. 3 has multiplicative parts 451 and 455, frequency division part 452, synchronizing part 453, and selecting part 454. Also, synchronizing part 453 is an embodiment of the synchronizing means of this invention.

Selecting part 454 is an embodiment of the selecting means of this invention.

Multiplicative part 451 is an embodiment of the first multiplicative means of this invention. Multiplicative part 455 is an embodiment of the second multiplicative means of this invention. Frequency division part 452 is an embodiment of the frequency division means of this invention.

Multiplicative Part 451

Multiplicative part 451 multiplies wobble clock signal CK1 output from wobble detecting part 43 by a prescribed multiplicative ratio, and multiplicative clock signal CK1A is input to synchronizing part 453.

Frequency Division Part 452

Frequency division part 452 performs frequency division for read clock signal CK2 output from clock reproduction part 41 at a prescribed frequency division ratio, and frequency divided clock signal CK2A is input to synchronizing part 453. For example, for a CD-R, assuming that the write speed is ×1 speed, then read clock signal CK2 and write clock signal CK3 are about 4.3 MHz, and the wobble clock signal is about 22 kHz.

When the difference in frequency between the two signals is large, it is difficult to generate the write clock signal at high stability at ×1 speed or a higher speed with only multiplicative part 455 to be explained later. Consequently, in write clock signal generating part 44 shown in FIG. 3, wobble clock signal CK1 is multiplied with multiplicative part 451 and the result is then input to synchronizing part 453, and, at the same time, read clock signal CK2 is frequency divided with frequency division part 452 and the result is input to synchronizing part 453 so that the frequency is in agreement with that of said multiplied clock signal CK1A.

Synchronizing Part 453

Synchronizing part 453 synchronizes wobble clock signal CK1A multiplied in multiplicative part 451 with read clock signal CK2A that has been frequency divided with frequency division part 452, and outputs it as clock signal CK1B. Then, when data write processing is restarted, that is, when the reproduction operation of read clock signal CK2 in clock signal reproduction part 41 is stopped by stopping read processing, the synchronized state of clock signal CK1B before restart is held.

When wobble clock signal CK1A and read clock signal CK2A are synchronized, synchronizing part 453 synchronizes them with high-speed common clock signal CKs and phase locks them to each other. Synchronizing part 453 synchronizes read clock signal CK2A with said clock signal CKs, and outputs it as read clock signal CK2B.

Figure 4:
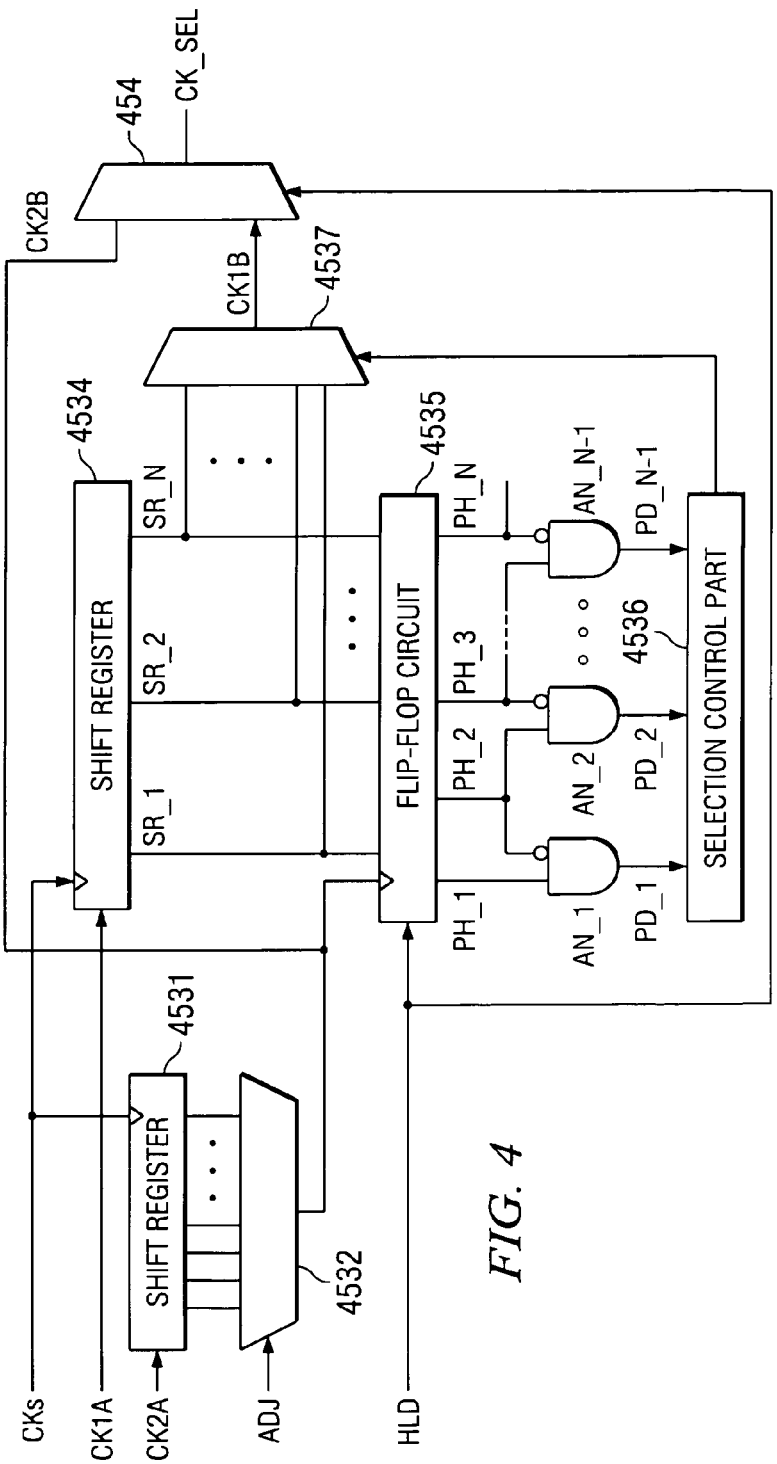
FIG. 4 is a block diagram illustrating an example of the constitution of the synchronizing part in the embodiment of this invention.

FIG. 4 is a block diagram illustrating an example of the constitution of synchronizing part 453 pertaining to the embodiment of this invention. In FIG. 4, selecting part 454 is also shown.

Synchronizing part 453 shown as an example in FIG. 4 has shift registers 4531, 4534, selecting parts 4532, 4537, flip-flop circuit 4535, AND circuits AN_1~AN_N−1 (N is a natural number of 2 or larger), and selection control part 4536. Also, shift register 4534 is an embodiment of the delay clock signal generating means of this invention. Flip-flop circuit 4535 is an embodiment of the signal holding means of this invention. The unit containing AND circuits AN_1~AN_N−1, selecting part 4537, and selection control part 4536 is an embodiment of the delay clock signal selecting means of this invention.

Shift Register 4531

Shift register 4531 has a circuit composed of plural flip-flop circuits connected in tandem and holding a signal synchronized with clock signal CKs, and read clock signal CK2A that is frequency divided with frequency division part 452 is input to the initial step of said tandem connection. As a result, read clock signal CK2A input to the initial step is sequentially shifted as it goes to the various steps. That is, shift register 4531 outputs plural delay clock signals having different phase differences with respect to read clock signal CK2A.

Selecting Part 4532

From among the plural delay signals output from shift register 4531, selecting part 4532 selects the delay clock signal corresponding to delay adjusting signal ADJ, and outputs it as read clock signal CK2B. Read clock signal CK2B is a signal that synchronizes read clock signal CK2A with clock signal CKs, and it has a delay corresponding to delay adjusting signal ADJ. Adjustment of the delay with delay adjusting signal ADJ is for compensating a delay in phase generated as the clock component of the read signal detected in optical pickup 2 passes through the various signal processing systems of analog front end part 3 and digital front end part 4. That is, read clock signal CK2A input to synchronizing part 453 has a delay corresponding to the constitution of the signal processing system for the clock component with light received in optical pickup 2. Delay adjusting signal ADJ is set such that a deviation in phase due to said delay is eliminated. Because the delay is nearly constant corresponding to the constitution of the signal processing system, it is possible to set the adjustment value of delay adjusting signal ADJ at a fixed value.

Shift Register 4534

Shift register 4534 has a circuit composed of N flip-flop circuits connected in tandem and holding a signal synchronized with clock signal CKs, and wobble clock signal CK1A that is multiplied in multiplicative part 451 is input to the initial step of said tandem connection. As a result, wobble clock signal CK1A input to the initial step is sequentially shifted as it goes to the various steps. That is, shift register 4534 outputs plural delay clock signals having different phase differences with respect to wobble signal CK1A. In the example shown in FIG. 4, delay clock signals SR_1, SR_2, ..., SR_N are output in increasing order of delay from wobble clock signal CK1A.

Flip-Flop Circuit 4535

When hold signal HLD is "0," flip-flop circuit 4535 holds delay clock signals SR_1, SR_2, ... SR_N output from shift register 4534 and synchronizes them with read clock signal CK2B, and outputs them as signals PH_1, PH_2, ..., PH_N, respectively. Also, when hold signal HLD is "1," flip-flop circuit 4535 maintains a constant signal level for signals PH_1, PH_2, ..., PH_N. Said hold signal HLD is a signal that becomes "0" in read processing, and "1" in write processing, and it is controlled with said write interruption control part 47, etc. Selecting part 454 selects and outputs clock signal CK2B when hold signal HLD is "0," that is, in read processing, and it selects and outputs clock signal CK1B when hold signal HLD is "1," that is, in write processing.

AND Circuit AN_1~AN_N−1

AND circuits AN_i (where i is an integer from 1 to N−1) performs the operation of AND of signal PH_i and signal PH_i+1, and outputs the obtained signal as signal PD_i. That is, AND circuit AN_i compares a delay clock signal which is output from shift register 4534 with the signal levels of output signal PH_i and PH_i+1 of flip-flop circuit 4535 corresponding to two adjacent delay clock signals SR_i and SR_i+1 in the row of SR_1, SR_2, . . . SR_N set in the order of the phase difference with respect to wobble clock signal CK1A. Then, it outputs signal PD_i that becomes "1" when signal PH_i is "1" and signal PH_i+1 is "0," and "0" otherwise.

Selection Control Part 4536

Selection control part 4536 checks which signal among signals PD_1~PD_N–1 is "1," and, corresponding to the result, it determines the signal that should be selected from among delay clock signals SR_1~SR_N. For example, when signal PD_i is "1," delay clock signal SR_i is determined as the signal that should be selected.

Selecting Part 4537

Selecting part 4537 selects the signal determined with selection control part 4536 from among delay clock signals SR_1~SR_N, and outputs it as clock signal CK1B.

Figure 5:
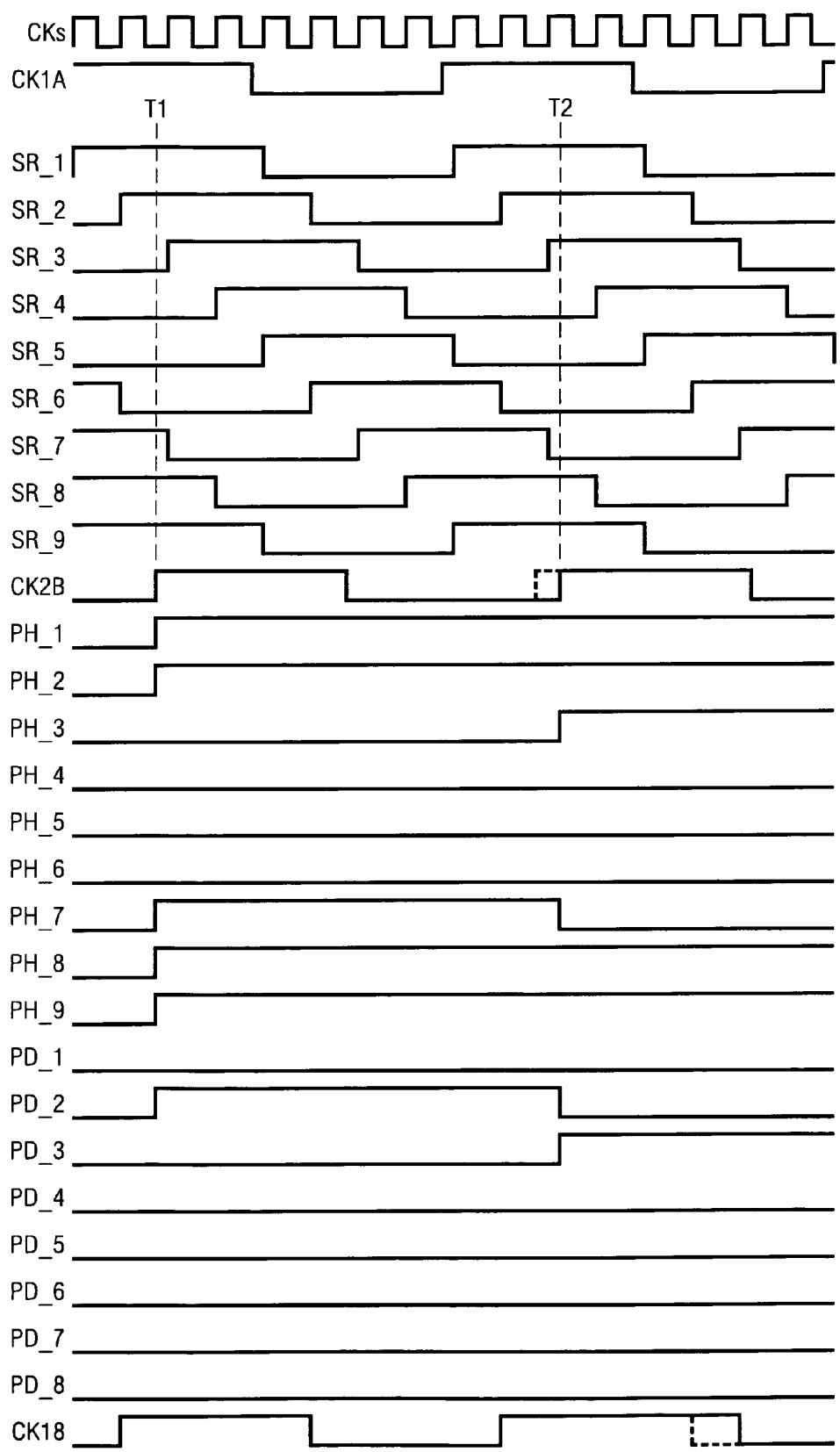
FIG. 5 is a timing chart illustrating an example of the operation of the synchronizing part shown in FIG. 4.

FIG. 5 is a timing chart illustrating an example of the operation of synchronizing part 453 shown in FIG. 4. In the example shown in FIG. 5, the frequency of clock signal CKs is about 8-fold wobble clock signal CK1A, and the number of steps of shift register 4534 is 9 (that is, N=9). As shown in FIG. 5 SR 1, SR 9, the phase delay with respect to wobble clock signal CK1A (FIG. 5(B)) gradually increases in the order of delay clock signals SR_1, . . . SR_9, and the phase interval corresponds to about ⅛the period of wobble clock signal CK1A.

As said delay clock signals SR_1~SR_9 are held in flip-flop circuit 4535 at the rise edges (times T1 and T2) of read clock signal CK2B, the hold level of the delay clock signal that rises before said rise edge becomes "1," and the hold level of the delay clock signal that rises after said rise edge becomes "0." Consequently, when signal PH_i is "1" and signal PH_i+1 is "0" (when PD_i is "1"), it is determined that the rise edge of read clock signal CK2B is held between the rise edge of delay clock signal SR_i and the rise edge of delay clock signal SR_i+1. That is, it is determined that either delay clock signal SR_i or SR_i+1 is nearest in phase with that of read clock signal CK2B.

In the example shown in FIG. 5, when signal PH_i is "1" and signal PH_i+1 is "0," delay clock signal SR_i is selected as the signal having a phase near read clock signal CK2B. For example, at time T1, because signal PH_2 is "1" and signal PH_3 is "0," and signal PD_2 is "1" (FIG. 5(W)), delay clock signal SR_2 is output as clock signal CK1B (FIG. 5(AD)).

Also, at time T2, because signal PH_3 is "1" and signal PH_4 is "0," and signal PD_3 is "1" (FIG. 5(W)), delay clock signal SR_2 is output as clock signal CK1B (FIG. 5(AD)).

Also, when a different delay clock signal is selected at each rise edge of read clock signal CK2B, as shown in FIG. 5(AD), jitter takes place in clock signal CK1B as the result of selection. This jitter can be reduced easily by reducing the phase interval between delay clock signal SR_i and delay clock signal SR_i+1, and by increasing the frequency of clock signal CKs.

Also, in order for the phase of wobble clock signal CK1B to be correctly in agreement with that of read clock signal CK2B, it is preferred that the range of phase of delay clock signals SR_1~SR_N be at least able to cover the phase of 1 period. That is, assuming that the frequency of clock signal CKs is x-fold (x is a positive real number) that of wobble clock signal CK1A and read clock signal CK2B, the number of steps of shift register 4534 is preferably at least equal to the minimum integer larger than real number x, or larger.

Also, when the phase range of delay clock signals SR_1~SR_N is over the phase of 1 period, two or more candidates may exist for selection of the delay clock signal. In this case, if either of the two candidates is selected, it is possible to realize phase locking. Consequently, one may select the delay clock signal according to the prescribed rule that the signal with the smallest delay among plural candidates is selected.

The aforementioned feature is an explanation of synchronizing part 453.

Selecting Part 454

In the following, explanation returns to that for FIG. 3. When data read processing is started with write interruption control part 47 under a write restart instruction from host device 5, selecting part 454 selects and outputs read clock signal CK2B output from synchronizing part 453. Also, when data write processing is restarted under control of write interruption control part 47, wobble clock signal CK1B synchronized with read clock signal CK2B with synchronizing part 453 is selected and output.

Multiplicative Part 455

Multiplicative part 455 multiplies clock signal CK_SEL output from selecting part 454 by a prescribed multiplicative ratio, and outputs write clock signal CK3. This multiplicative ratio can be changed corresponding to the data write speed in optical disk 1 set with a control part not shown in the figure.

In the following, the constitution of a part that generates a write interruption instruction corresponding to vibration in interrupt instruction generating part 49 will be explained with reference to FIG. 6.

Figure 6:
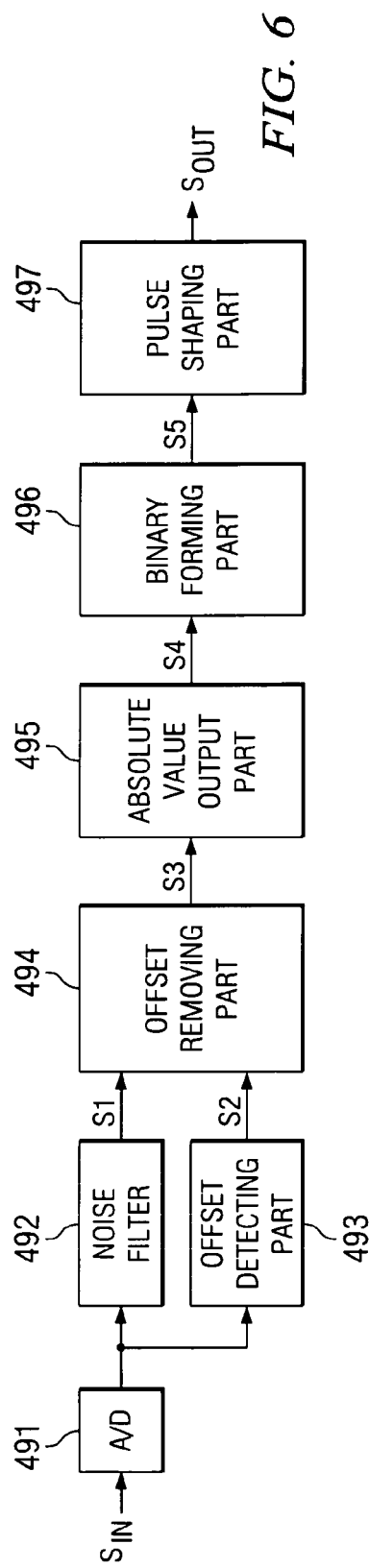
FIG. 6 is a block diagram illustrating an example of the constitution of the interrupt instruction generating part in the embodiment of this invention.

FIG. 6 is a block diagram illustrating an example of the constitution of interrupt instruction generating part 49 in the embodiment of this invention. Interrupt instruction generating part 49 shown as an example in FIG. 6 has analog/digital converting part 491, noise filter 492, offset detecting part 493, offset removing part 494, absolute value output part 495, binary forming part 496, and pulse shaping part 497.

Analog/Digital Converting Part 491

For example, analog/digital converting part 491 has a tracking error signal output from analog front end part 3 or a detection signal of a vibration sensor not shown in the figure input to it, and converts the input signal to a digital signal.

Noise Filter 492

Noise filter 492 removes the noise component of the signal digitalized with analog/digital converting part 491.

Offset Detecting Part 493

Offset detecting part 493 detects the low-frequency offset component from the signal digitalized with analog/digital converting part 491.

Offset Removing Part 494

Offset removing part 494 removes offset component S2 detected with offset detecting part 493 from signal S1 that has the noise removed with noise filter 492.

Absolute Value Output Part 495

Absolute value output part 495 converts a signal having a negative sign in signal S3 that has the offset component removed with offset removing part 494 to a positive signal having the same absolute value.

Binary Forming Part 496

Binary forming part 496 compares signal S4 that has been converted to the absolute value with absolute value output part 495 with a prescribed threshold, and converts a signal larger than said threshold to "1," and a signal smaller than said threshold to "0."

Pulse Shaping Part 497

When output signal Sout is "0" and input signal S5 from binary forming part 496 remains "1" for longer than a prescribed period, pulse shaping part 497 changes output signal Sout to "1." Also, when output signal Sout is "1," and input signal S5 remains "0" for longer than a prescribed period, it changes output signal Sout to "0." For example, pulse shaping part 497 can be realized with a state machine with a constitution that imparts state transition to the transition target when the value of input signal S5 remains at the value of the transition target for longer than a prescribed period.

With interrupt instruction generating part 49 with the aforementioned constitution, in analog/digital converting part 491, a tracking error signal, a vibration sensor detection signal, or another prescribed signal having an amplitude corresponding to the vibration state of the device is input and is converted to a digital signal. For this digital signal, the noise component is removed with noise filter 492, and, at the same time, a low-frequency offset component is detected with offset detecting part 493. Then, with offset removing part 494, offset component S2 is removed from signal S1 after noise removal.

After conversion to the absolute value with absolute value output part 495, based on comparison with a prescribed threshold in binary forming part 496, signal S3 with offset removed from it is converted to the binary signal of "1" or "0," and its waveform is shaped with pulse shaping part 497.

Figure 7:
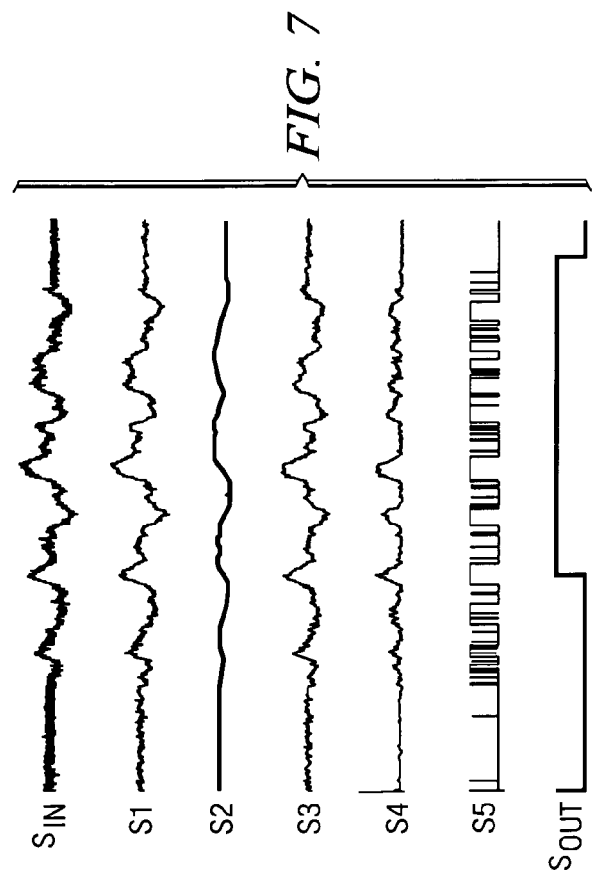
FIG. 7 is a waveform diagram illustrating an example of the signal waveforms of the various portions of the interrupt instruction generating part when the detection signal of a vibration sensor is input.
Figure 8:
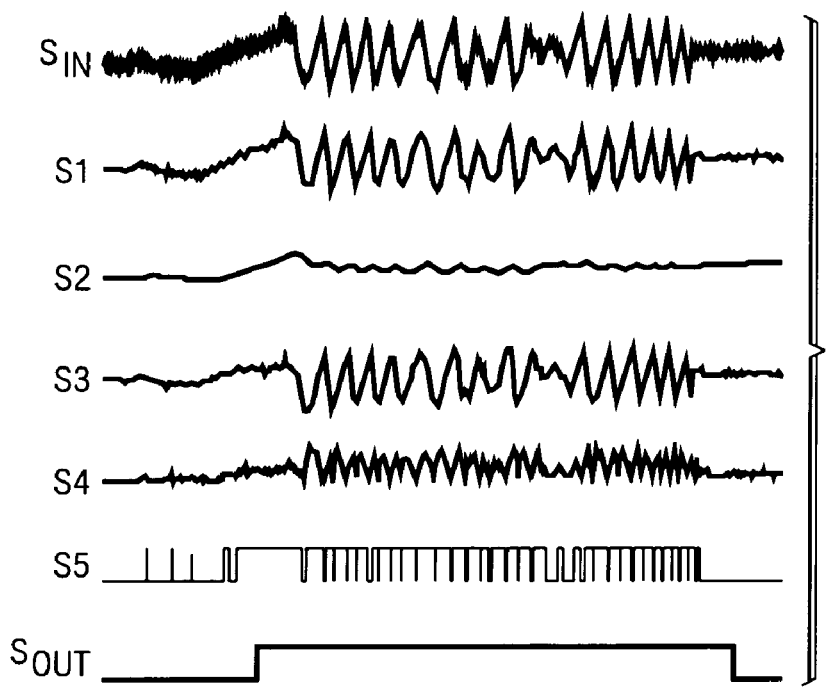
FIG. 8 is a waveform diagram illustrating an example of the signal waveforms of the various portions of the interrupt instruction generating part when a tracking error signal is input.
Figure 9:
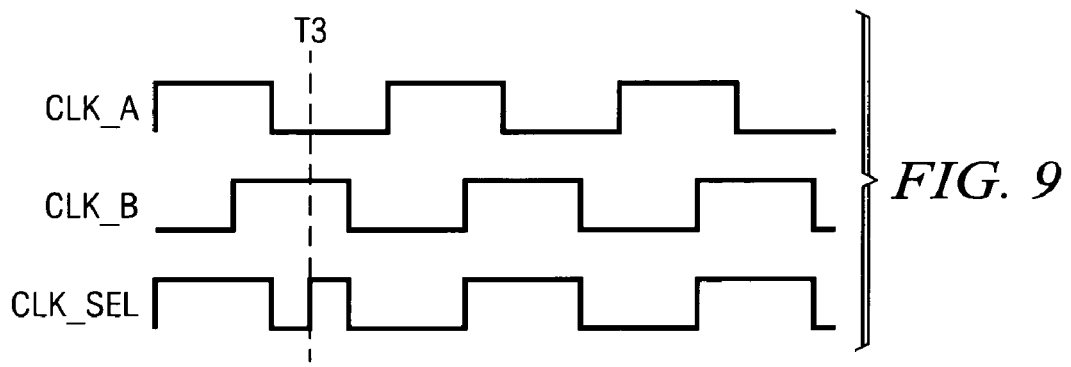
FIG. 9 is a first diagram illustrating an example of the method for switching the clock signal.
Figure 10:
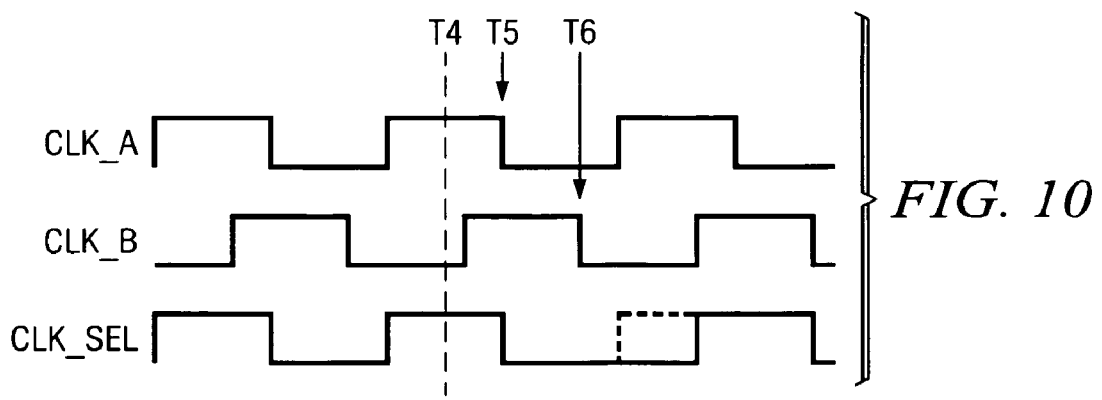
FIG. 10 is a second diagram illustrating an example of the method for switching the clock signal.

FIGS. 7 and 8 are waveform diagrams illustrating an example of the signal waveforms of various portions in interrupt instruction generating part 49.

FIG. 7 shows a signal waveform when the detection signal of a vibration sensor is input as input signal Sin. FIG. 8 shows the waveform of a signal when a tracking error signal is input as input signal Sin. As shown in FIGS. 7 and 8, when the amplitude of the input signal increases due to vibration of the device, Sout as signal "1" is output as the write interruption instruction.

In the following, interruption operation of the restart operation of write processing in the optical disk device with the aforementioned constitution will be explained.

Interruption of Write Processing

In data write processing, with optical pickup 2, a laser beam for generating a control signal is irradiated on optical disk 1, and reflected light is converted to an electric signal. Analog front end part 3 performs A/D conversion, waveform shaping, and other treatment for the electric signal, and generates a tracking error signal, focus error signal, and other control signals. Based on these control signals, DSP 40 controls the driving mechanism of the spindle motor, thread motor, etc., and the laser beam of optical pickup 2 is guided to the desired write position on optical disk 1.

Based on the wobble component contained in the control signal generated in analog front end part 3, wobble detecting part 43 reproduces wobble clock signal CK1. Write clock signal generating part 44 multiplies said wobble clock signal CK1 by the prescribed multiplicative ratio, and write clock signal CK3 is generated. That is, in write clock signal generating part 44, multiplicative part 451 multiplies wobble clock signal CK1 by the prescribed ratio, and shift register 4534 converts said multiplied wobble clock signal CK1A to plural delay clock signals SR_1~SR_N synchronized with clock signal CKs. Selecting part 4537 selects one delay clock signal from among said plural delay clock signals SR_1~SR_N, and this delay clock signal is input as clock signal CK1B to selecting part 454. Also, in data write processing, selecting part 454 selects said clock signal CK1B for input to multiplicative part 455, so that write clock signal CK3 becomes a signal of multiplied clock signal CK1B. Consequently, write clock signal CK3 becomes a signal of multiplied wobble clock signal CK1. Also, in this case, for example, the delay clock signal selected with selecting part 4537 may be a signal determined with selection control part 4536 in the preceding round of read processing or a prescribed delay clock signal.

On the other hand, write data supplied from host device 5 and stored in buffer memory 46 are sequentially read by processing part 45 in synchronization with said write clock signal CK3, and a prescribed encoding processing is performed. Write pulse signal generating part 48 performs appropriate processing corresponding to the type of optical disk 1 on encoded write data to generate a write pulse signal in synchronization with write clock signal CK3. Corresponding to said write pulse signal, analog front end part 3 drives the laser source of optical pickup 2, and generates a laser beam for data write.

By means of the aforementioned operation, the laser beam is irradiated corresponding to the write data supplied from host device 5 at the target write position of optical disk 1. When data write processing is performed in this way, when the write data stored in buffer memory 46 fall below a prescribed quantity, or when the amplitude of the tracking error signal or the detection signal of the vibration sensor reaches a prescribed amplitude, or in another case when a prescribed write interruption factor takes place, interrupt instruction generating part 49 generates a write interrupt instruction.

When interrupt instruction generating part 49 generates the write interrupt instruction, write interruption control part 47 checks the data before write of the data output from write data processing part 45 to determine the appropriate interruption position. Then, data transfer from write data processing part 45 to write pulse signal generating part 48 is stopped at this interruption position. As a result, irradiation of the laser beam from optical pickup 2 is stopped. Also, for example, information for identification of the prescribed data segment of the data for write in optical disk 1 or the like is obtained as the prescribed information for indicating the tail of the data written in optical disk 1 before interruption of the data output from write data processing part 45.

Restart of Write Processing

When the write interruption factor is removed, and a write restart instruction is input from host device 5, write interruption control part 47 gives instructions to the various portions of digital front end part 4, and data read processing is restarted.

After restart of data read processing, for optical pickup 2, the laser beam for data read and for generating the control signal is irradiated on the recording surface of optical disk 1, and the reflected light is converted to an electric signal. Analog front end part 3 performs A/D conversion, waveform shaping, and other processing for the electric signal to generate a tracking error signal, focus error signal, and other control signals. Based on these control signals, DSP 40 controls the driving mechanism, and the laser beam of optical pickup 2 is guided to the target read position of optical disk 1. In this way, the laser beam for read is irradiated on the recording track of optical disk 1 that had performed write before said interruption, and the read signal corresponding to the data written before interruption is output from analog front end part 3.

Clock signal reproduction part 41 reproduces read clock signal CK2 based on the periodic component contained in the read signal. Read data processing part 42 performs a prescribed decoding processing for the read signal and reproduces read data RD in synchronization with reproduced read clock signal CK2. Then, write interruption control part 47 determines the tail of the write data before interruption from among the reproduced read data based on said obtained information.

On the other hand, after data read processing is restarted, selecting part 454 of write clock signal generating part 44 behaves differently from during the data write processing, and clock signal CK2B is selected and output to multiplicative part 455. Clock signal CK2B is a signal obtained by frequency division of read clock signal CK2 and has a prescribed delay in synchronization with clock signal CKs. Consequently, write clock signal CK3 obtained by multiplying said signal with multiplicative part 455 becomes a signal in synchronization with read clock signal CK2. Also, during said data read processing, flip-flop circuit 4535 holds delay clock signals SR_1~SR_N output from shift register 4535 in synchronization with clock signal CK2B, and outputs them as signals PH_1~PH_N.

In addition, based on the phase difference with clock signal CK1A, AND circuits AN_1~AN_N−1 compare the signal levels of output signals PH_i and PH_i+1 of flip-flop circuit 4535 corresponding to two adjacent delay clock signals SR_i and SR_i+1 in the row of delay clock signals set in the order of SR_1, SR_2, . . . SR_N.

Based on the comparison result, selection control part 4563 selects the delay clock signal with a phase difference with clock signal CK1A. For example, when signal PH_i="1" and signal PH_i+1="0" are established, the signal for selecting delay clock signal SR_i is determined. According to the determination made with selection control part 4563, selecting part 4537 selects a delay clock signal from among delay clock signals SR_1~SR_N, and outputs it as clock signal CK1B. That is, synchronizing part 453 adjusts the phase of clock signal CK1B such that the phase difference between clock signal CK1B and clock signal CK2B between the data read processing becomes small.

As the tail of the write data is determined from among the read data, write interruption control part 47 gives instructions to the various portions of digital front end part 4, and, while data read processing is stopped, data write processing is restarted from the position after the tail.

When data write processing is restarted, selecting part 454 switches the signal output to multiplicative part 455 from clock signal CK2B to clock signal CK1B. In this case, because the phase difference between clock signal CK1B and clock signal CK2B is small, the discontinuity in company with switching is small. Also, because read clock CK2 is not obtained from clock signal reproduction part 41 in company with the stop of data read processing, synchronizing part 453 holds a constant output signal level in flip-flop circuit 4553, and the state of synchronization of clock signal CK1B and clock signal CK2B is held.

As explained above, in this embodiment, when write is interrupted, information indicating the tail of the data written before said interruption is obtained from among the write data. When write is to be restarted, first of all, data read processing is started, and the tail of the write data before said interruption is determined based on said obtained information from among the read data. Then, data write processing is restarted after the determined tail of the write data. That is, data write is connected by means of data write processing to the tail of the write data determined by means of data read processing.

Because data read processing is in synchronization with read clock signal CK2, and data write processing is in synchronization with write clock signal CK3, if there is a phase deviation between the two clock signals, data write connection may become discontinuous. In this embodiment, in write clock signal generating part (44), write clock signal CK3 locked to the phase of read clock signal CK2 is generated, so that discontinuity in the write connection can be suppressed. Consequently, in this embodiment, after interruption of data write processing on the optical disk, it is possible to restart write processing of the data correctly from the interruption position. As a result, because error in the recording data near the write connection position can be reduced, it is possible to improve the reliability of the recording operation.

Also, in synchronizing part 453, when wobble clock signal CK1A as a reference of the timing of the write processing is synchronized with read clock signal CK2A, and data write processing is restarted, the state of synchronization before restart is held by means of synchronizing part 453. Consequently, although the reproduction processing of a read clock signal is stopped in company with restart of data write processing, the state of synchronization before the stop can be held.

Also, as shown in FIG. 4, in synchronizing part 453, it is possible to lock the phases of the two clock signals without using an analog PLL. Consequently, it is possible to reduce the circuit area.

In addition, selecting part 454 selects and outputs read clock signal CK2B when a write restart is input from host device 5, and it selects and outputs wobble clock signal CK1B when data write processing is restarted. The clock signal output from said selecting part 454 is multiplied with multiplicative part 455, and the obtained signal is output as write clock signal CK3. Consequently, the frequency of write clock signal CK3 can be freely changed in multiplicative part 455. Consequently, it is possible to perform write in the optical disk at various speeds.

In addition, it is possible to supply a clock signal with a phase nearly locked around restart of data write processing to multiplicative part 455. Consequently, especially in the case when multiplicative part 455 consists of a PLL, it is possible to suppress variation in phase of write clock signal CK3 around the restart of the data write processing. Also, in interrupt instruction generating part 49 with the constitution shown in FIG. 6, for example, a write interruption instruction can be generated with vibration of the device as a factor based on a tracking error signal or other prescribed signal having an amplitude corresponding to the vibration state of the device. Consequently, it is possible to reduce the additional parts of vibration sensors.

This invention is not limited to the aforementioned embodiment. For example, the following various modifications may be performed.

In the aforementioned embodiment, a wobble clock signal reproduced based on the wobble of the optical disk is used as the reference clock in data write processing. However, this invention is not limited to this scheme. That is, any clock signal reproduced based on information other than wobble, as long as it is information that can be applied to the recording medium beforehand for determining the data recording position on the recording medium, may be used as a reference clock signal. Also, when write is performed at a constant linear velocity, one may use a clock signal at a fixed frequency generated with an oscillator or the like.

In the example shown in FIG. 2, an interrupt instruction is generated corresponding to a tracking error signal in interrupt instruction generating part 49. However, one may also execute a portion or entire said processing in DSP 40. The aforementioned embodiment pertains to a data recording/reproduction device of an optical disk. However, this invention is not limited to this type. It may also be applied in data recording/reproduction devices using recording media other than optical disks (such as optomagnetic tapes, optomagnetic disks, etc.).

The invention claimed is:

1. A data processing device in which the data processing device performs data read processing from a recording medium in synchronization with a read clock signal reproduced based on data written in the recording medium, and performs data write processing in said recording medium in synchronization with a write clock signal; the data processing device comprising:
a write interruption control part that performs the following operation: when a write interruption instruction is input, said data write processing is interrupted, and prescribed information that indicates the tail of the data written before said interruption is fetched from the write data, and, when a write restart instruction is input, said data read processing is started, the tail of the data written before said interruption is determined from the read data based on said fetched information, and said data write processing is restarted after the tail of said determined write data; and a clock signal generating means that generates said write clock signal with a phase synchronized with said read clock signal wherein said write clock signal generating means comprises:
a synchronizing means that synchronizes an input reference clock signal with said read clock signal, and, when said data write processing is restarted, holds the synchronization state before said restart, wherein said write clock signal generating means contains a first multiplicative part that generates said reference clock signal by multiplying by a prescribed multiplicative ratio the clock signal reproduced based on information pre-applied to said recording medium for specifying the data recording position on said recording medium, and wherein said write clock generating means comprises:
a selecting means that selects and outputs said read clock signal when said write restart instruction is input, and selects and outputs said reference clock signal synchronized with said synchronizing means when said data write processing is restarted; and a second multiplicative means that multiplies the clock signal output from said selecting means by a prescribed multiplicative ratio and generates said write clock signal.

2. The data processing device described in claim 1 wherein said synchronizing means comprises:
a delay clock signal generating means that generates plural delay clock signals, which are obtained by delaying said reference clock signal and have different phase differences with respect to said reference clock signal;
a signal holding means that holds said generated plural delay clock signals in synchronization with said read clock signal, and, when said data write processing is restarted, outputs the signal held before restart; and a delay clock signal selecting means that compares the output signal level of said signal holding means for the two delay clock signals, which are adjacent to each other in the sequence of said plural delay clock signals set according to said phase difference, and, corresponding to the comparison result, selects and outputs a delay clock signal from said plural delay clock signals.

3. The data processing device described in claim 2 further comprising:
said write clock generating means contains a frequency dividing part that performs frequency division for said read clock signal at a prescribed frequency division ratio; and said synchronizing means synchronizes said reference clock signal with the read clock signal that has been frequency divided with said frequency dividing means.

4. The data processing device described in claim 2 further comprising:
interrupt instruction generating means having a prescribed signal having an amplitude corresponding to the vibration state of the device as input, and generates said write interruption instruction when the amplitude of said input signal reaches a prescribed amplitude.

5. The data processing device described in claim 1 wherein said write clock generating means comprises:
a selecting means that selects and outputs said read clock signal when said write restart instruction is input, and selects and outputs said reference clock signal synchronized with said synchronizing means when said data write processing is restarted; and a second multiplicative part that multiplies the clock signal output from said selecting means by a prescribed multiplicative ratio and generates said write clock signal.

6. The data processing device described in claim 5 further comprising:
said write clock generating means contains a frequency dividing part that performs frequency division for said read clock signal at a prescribed frequency division ratio; and said synchronizing means synchronizes said reference clock signal with the read clock signal that has been frequency divided with said frequency dividing means.

7. The data processing device described in claim 5 further comprising:
interrupt instruction generating means having a prescribed signal having an amplitude corresponding to the vibration state of the device as input, and generates said write interruption instruction when the amplitude of said input signal reaches a prescribed amplitude.

8. The data processing device described in claim 1 further comprising:
said write clock generating means contains a frequency dividing part that performs frequency division for said read clock signal at a prescribed frequency division ratio; and said synchronizing means synchronizes said reference clock signal with the read clock signal that has been frequency divided with said frequency dividing means.

9. The data processing device described in claim 8 further comprising:

interrupt instruction generating means having a prescribed signal having an amplitude corresponding to the vibration state of the device as input, and generates said write interruption instruction when the amplitude of said input signal reaches a prescribed amplitude.

10. The data processing device described in claim 1 further comprising:

interrupt instruction generating means having a prescribed signal having an amplitude corresponding to the vibration state of the device as input, and generates said write interruption instruction when the amplitude of said input signal reaches a prescribed amplitude.

11. The data processing device described in claim 10 wherein said interrupt instruction generating generates said write interruption instruction when the state in which the amplitude of said input signal reaches a prescribed amplitude lasts for a prescribed period.

12. The data processing device described in claim 10 wherein as said prescribed signal, a signal indicating tracking error when tracking treatment is performed for the data recording track on said recording medium in said data write processing is input to said interrupt instruction generating means.

13. The data processing device described in claim 1 wherein data that are divided into plural data segments and written on said recording medium, said control means obtaining information indicating the tail of said write data based on information for identifying said plural data segments.

14. A data recording/reproduction device in which the data recording/reproduction device performs data read processing from a recording medium in synchronization with a read clock signal reproduced based on data written in the recording medium, and it performs data write processing in said recording medium in synchronization with a write clock signal; the data recording/reproduction device comprising:

a write interruption control part that performs the following operation: when a write interruption instruction is input, said data write processing is interrupted, and prescribed information that indicates the tail of the data written before said interruption is fetched from the write data, and, when a write restart instruction is input, said data read processing is started, the tail of the data written before said interruption is determined from the read data based on said fetched information, and said data write processing is restarted after the tail of said determined write data; and a clock signal generating means that generates said write clock signal with a phase synchronized with said read clock signal, wherein said write clock signal generating means contains a synchronizing means that synchronizes an input reference clock signal with said read clock signal, and, when said data write processing is restarted, holds the synchronization state before said restart, wherein said write clock generating means comprises:

a selecting means that selects and outputs said read clock signal when said write restart instruction is input, and selects and outputs said reference clock signal synchronized with said synchronizing means when said data write processing is restarted; and a second multiplicative part that multiplies the clock signal output from said selecting means by a prescribed multiplicative ratio and generates said write clock signal.

* * * * *